S. H. STOFFEL & H. J. JANSSEN.
REVERSIBLE COUPLING.
APPLICATION FILED JULY 22, 1913.
1,157,968.
Patented Oct. 26, 1915.
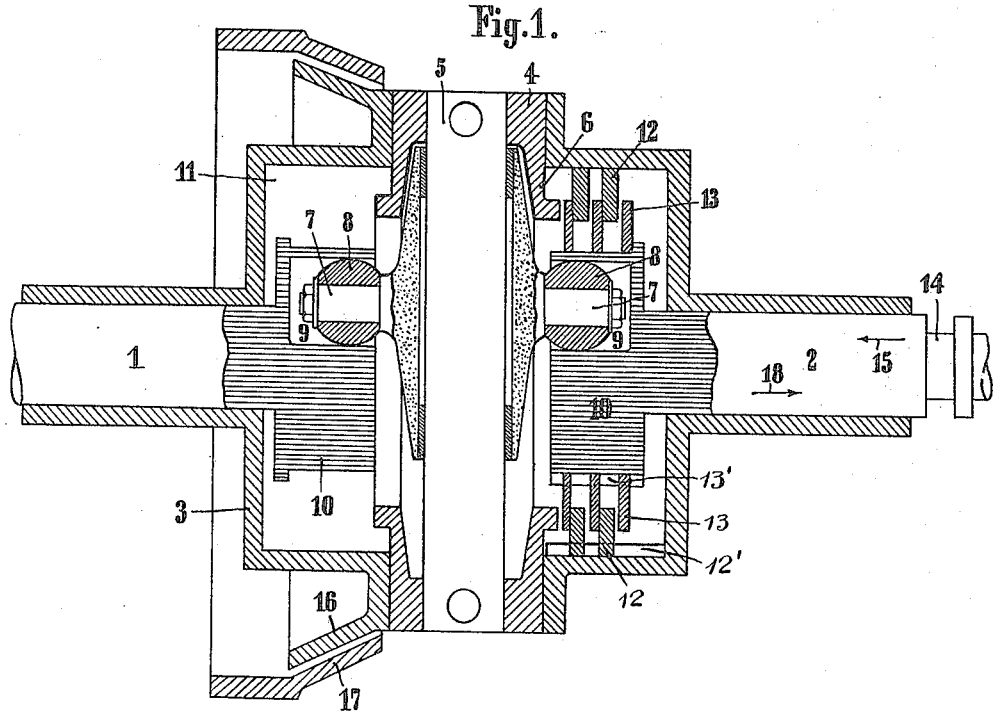
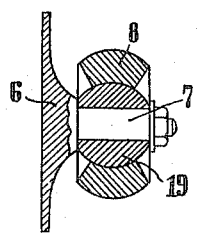
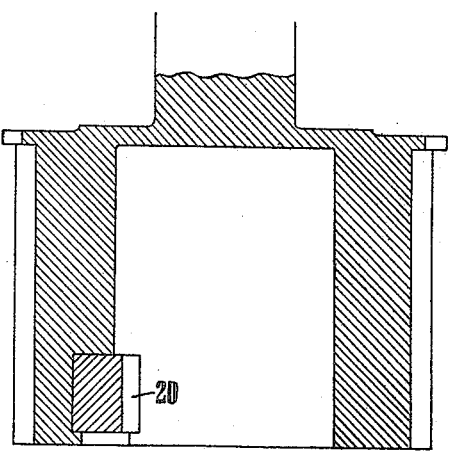
Witnesses:
Inventors.
S. H. Stoffel
H. J. Janssen
By Percy H. Moore
ATTY

UNITED STATES PATENT OFFICE.

SIMON HENRI STOFFEL AND HENDRIK JAN JANSSEN, OF DELFT, NETHERLANDS.

REVERSIBLE COUPLING.

1,157,968.  Specification of Letters Patent.  Patented Oct. 26, 1915.

Application filed July 22, 1913.  Serial No. 780,434.

*To all whom it may concern:*

Be it known that we, SIMON HENRI STOFFEL and HENDRIK JAN JANSSEN, subjects of the Netherlands, residing at Delft, Netherlands, have invented certain new and useful Improvements in and Relating to Reversible Couplings, of which the following is a specification.

This invention refers to the type of reversible couplings for co-axial shafts in which a coupling housing is provided which can either rotate freely or be clutched to a shaft to obtain a direct drive or to a fixed casing to obtain a reverse drive, the coupling device for the shafts being located in the housing. The coupling portion itself consists of a part or member rotatably mounted on an axle carried in the housing and in such a way that it can slide with respect to such axle, this member being connected with the shafts by means of rotatable heads or the like engaging guideways carried by the shafts.

The essential feature of the present invention consists in providing in the space between the thickened heads of the shafts to be coupled together and the inner surface of the housing on both sides of the sliding piece, laminated coupling devices adapted to relieve the sliding piece, such coupling devices consisting of disks or rings connected with the ends of the shafts by means of keyways and keys and other disks or rings connected to the housing by keyways and keys, so that when the housing is moved in one direction the laminated couplings are brought into engagement and the shafts are rigidly coupled with the housing and consequently are driven in the same direction while on moving the housing in the opposite direction the laminated couplings are uncoupled, and the housing is locked by a conical coupling or brake and the driven shaft then rotates in the opposite direction to the driving shaft.

With the foregoing construction, moreover, the result is obtained when the device is adapted to the propelling mechanism of ships than when driving in the forward direction that is when the driven shaft and the driving shaft are driving in the same direction, the laminated coupling is held in engagement and the rod or the like for effecting the coupling can be released, while when reversing that is to say when the driving shaft is turning in the opposite direction to the driven shaft and the screw, and the housing is in engagement with the fixed casing by means of the conical coupling the rod or the like effecting the coupling can again be released.

The invention further provides means for compensating for the wear between the pins or equivalent parts entering the recesses in the enlarged ends of the shafts.

Figure 1 is a longitudinal section of my device. Fig. 2 is a section illustrating one method of forming the spherical portion of the sliding part. Fig. 3 shows a special formation of the ring-like excentric recess in the thickened head of the driving or driven shaft for the purpose of compensating for irregularities in the spherical shaped bodies engaging in the recesses.

1 is the driving shaft.
2 is the driven shaft.
3 is a housing in which the device for coupling the two shafts is located. The entire housing 3 can slide axially with respect to the shafts 1 and 2, and has on the inside thereof a transverse axle 5 located in an inner bush or liner 4, upon which it is rotatably mounted, remaining however in fixed relation to the casing 3, a sliding piece 6 provided with pins 7, upon which pins spherical or cylindrical heads or bodies 8 are rotatably mounted. These bodies 8 engage in cylindrical recesses 9 in the thickened end bosses or coupling members 10 of the parts 1 and 2. The diameter of these end bosses 10 is smaller than the inner diameter of the housing 3. In the circular ring like space 11 thus formed, are provided at the side of the liner 4 and in such a way as to take the strain off the member 6, laminated couplings consisting of disks 12 connected with the housing 3 by keys and keyways 12' and disks 13 connected with the box like end or heads 10 by means of keyways and keys 13'. In the drawings, for the sake of clearness, the laminæ are only shown in one of the side spaces 11.

If the shaft 2, which may be the driving shaft for the propeller of a vessel is slid axially with respect to the housing, for instance by means of a coupling ring engaging in a groove 14 and in direction of the arrow 15, in such a way that the laminæ 13 come in couple engagement with the laminæ 12, then the shaft 2 turns synchronously and in the same direction with the shaft 1. In this case, moreover, the axial thrust exerted by the ship's propeller operates to maintain the couple position between the laminæ 12 and 13, so that the coupling pin which takes into the groove 14 can be released, or relieved.

Where it is required to reverse, the shaft 2 is pulled in the direction of the arrow 18 until it brings the cone member 16 of the casing 3 into engagement with the fixed cone member 17 thus holding the casing 3 and preventing its rotation. At the same time the laminæ 12 and 13 have been brought out of engagement. When the shaft 1 is rotated the body 8, contained in the recess 9 in the enlarged end of the shaft, is carried around by the said enlarged end because the center of this body can move only upon the surface of a cylinder the axis of which is the axis of the shaft 1. As the shaft rotates it carries around the body 8 at the same time causing the sleeve 6 to slide upon the now fixed axle 5 and to rotate for a sufficient distance around the same to enable the body 8 to follow its required path. On consideration it will be seen that as the body 8 coöperating with the shaft 1 is moving forward and downward, owing to the combined rotary and sliding movements of the sleeve 6 the other body 8 in connection with the shaft 2 will be moved backward and downward, so that the shaft 2 will be rotated in a reverse direction to the shaft 1. It may be observed that the centers of the bodies 8 also move on the surface of a cylinder having its axis coinciding with the axis of the axle 5, so that the actual path of the center of each of the bodies 8 is the line of intersection of two cylinders one having an axis corresponding to the shaft 1 and the other having an axis corresponding with the axis of the axle 5. At the same time, moreover, the pull of the screw operates in the direction of the arrow 18 and consequently the conical coupling is kept in engagement and the coupling pin itself can be again released.

In the method of carrying out the invention according to Fig. 2 a spherical part 19 is adapted to the pin 7 of the sliding piece 6, and upon the part 19 is first mounted the spherical body 8 which again engages in the eccentric recess of the thickened head upon the driving or driven axle. If a spherical shape body closely fitting into a corresponding eccentric recess is provided, the central point of the sphere moves upon a cylinder concentric with the axis of the shaft. If the second sphere fits tightly in its recess, then its central point would move upon a cylinder of the same diameter concentric with the axle of the shaft. Should irregularities exist in the formation of the two spheres, or should such irregularities be produced by the wear of the spheres, then the two spheres would not move upon the same cylinder around the axle of the shaft and a binding or jamming action would result between the spheres and the eccentric recess. In order to avoid the foregoing drawback, we proceed in the following way. We provide a device or devices, such as that illustrated in Fig. 3 in which 20 is a half moon or crescent shaped piece. One of these pieces is adapted to be fitted into one or each of the recesses in the thickened head of the driving axle. In order to compensate for irregularities in the construction of the spherical shape bodies the half moon or crescent shape piece 20 may be inserted when the coupling is first fitted together, or a piece such as described may be inserted to compensate for irregularities produced by wear at any time.

What we claim and desire to secure by Letters Patent is.

1. In a reversible coupling, a power shaft, a driven shaft, concentric heads on the opposing ends of said shafts, a housing surrounding said shaft heads and slidably mounted with relation to said shafts, a transverse shaft rotatably mounted in said housing, a sliding piece mounted upon said shaft, recesses having bearing faces formed in the opposing faces of the heads of said shaft, pins on said sliding piece adapted to enter the recesses on said shafts, said bearing faces being eccentric to the shafts, laminated coupling rings secured to the interior of said housing, laminated coupling rings secured to the head of one of said shafts, said coupling rings being adapted to co-act.

2. In a reversible coupling, a power shaft, a driven shaft, concentric heads on the opposing ends of said shaft, a housing surrounding said shaft heads and slidably mounted with relation to said shafts, a transverse shaft rotatably mounted in said housing, a sliding piece mounted upon said shaft, recesses having bearing faces formed in the opposing faces of the heads of said shafts, pins on said sliding piece adapted to enter the recesses on said shafts, spherical bodies mounted on said pins, crescent shaped pieces inserted in said recesses to engage said spherical bodies, said bearing faces being eccentric to the shafts, laminated coupling rings secured to the interior of said housing, laminated coupling rings secured to the head of one of said shafts, said coupling rings being adapted to co-act.

In testimony whereof we affix our signatures in presence of two witnesses.

SIMON HENRI STOFFEL.
HENDRIK JAN JANSSEN.

Witnesses:
M. BAKER,
J. W. FAFEE.